(12) United States Patent
Atherton

(10) Patent No.: US 7,299,678 B2
(45) Date of Patent: Nov. 27, 2007

(54) SENSOR APPARATUS

(75) Inventor: Eric Atherton, Witney (GB)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/240,134

(22) PCT Filed: Mar. 27, 2001

(86) PCT No.: PCT/GB01/01326

§ 371 (c)(1),
(2), (4) Date: Sep. 27, 2002

(87) PCT Pub. No.: WO01/73380

PCT Pub. Date: Oct. 4, 2001

(65) Prior Publication Data

US 2003/0101822 A1 Jun. 5, 2003

(30) Foreign Application Priority Data

Mar. 27, 2000 (GB) ................................. 0007325.4

(51) Int. Cl.
*G01N 27/00* (2006.01)
(52) U.S. Cl. .................... 73/24.06; 73/579; 73/DIG. 1; 73/24.01
(58) Field of Classification Search .................. 73/579, 73/610, 644, DIG. 1; 374/117
See application file for complete search history.

(56) References Cited

U.S. PATENT DOCUMENTS

| | | | | |
|---|---|---|---|---|
| 3,355,949 A | | 12/1967 | Elwood et al. | 374/117 |
| 4,102,195 A | * | 7/1978 | Thompson et al. | 374/117 |
| 4,459,042 A | * | 7/1984 | Paros | 374/117 |
| 4,535,638 A | | 8/1985 | EerNisse et al. | 73/862.59 |
| 4,607,530 A | | 8/1986 | Chow | 73/708 |
| 4,760,351 A | * | 7/1988 | Newell et al. | 331/48 |
| 4,878,226 A | * | 10/1989 | McQuoid et al. | 374/166 |
| 5,299,868 A | | 4/1994 | Dennis et al. | 374/117 |
| 5,379,639 A | | 1/1995 | Hulsing, II et al. | 73/517 AV |
| 5,445,008 A | * | 8/1995 | Wachter et al. | 73/24.06 |
| 5,488,866 A | * | 2/1996 | Ravel et al. | 73/579 |
| 5,836,691 A | | 11/1998 | Yamauchi | 374/117 |
| 6,359,444 B1 | * | 3/2002 | Grimes | 324/633 |
| 6,494,079 B1 | * | 12/2002 | Matsiev et al. | 73/24.05 |

FOREIGN PATENT DOCUMENTS

| | | |
|---|---|---|
| EP | 0 371 592 B1 | 6/1990 |
| GB | 2201778 A * | 9/1988 |
| GB | 2 352 814 A | 2/2001 |
| GB | 2 355 801 A | 5/2001 |

* cited by examiner

*Primary Examiner*—Hezron Williams
*Assistant Examiner*—Rose M Miller
(74) *Attorney, Agent, or Firm*—Madan Mossman & Sriram PC

(57) ABSTRACT

A measurement head particularly for borehole use can measure multiple parameters with no electronics in the head and only a single conductor cable. Double-ended tuning forks (26, 28 and 38, 40) in the head are arranged to respond to different parameters such as temperature and pressure by adjusting their resonant frequencies. A drive signal on the conductor (50) is applied to transducers (30, 32, 42, 44) on all the tuning forks and those whose instantaneous resonant frequency is close will resonate. The signal is removed and the transducers return a decaying signal at the resonant frequency along the conductor. Other drive frequencies are tried, to locate the other sensors whose frequency ranges are separate.

16 Claims, 3 Drawing Sheets

SENSOR APPARATUS

RELATED APPLICATIONS

This application is a 35 U.S.C. 371 national stage filing of, and claims priority to, International Application No. PCT/GB01/01326, filed Mar. 27, 2001, which in turn claims priority to Great Britain Patent Application No. 0007325.4 filed on Mar. 27, 2000 in Great Britain. The contents of the aforementioned applications are hereby incorporated by reference.

FIELD OF THE INVENTION

The present application relates to sensor apparatus. It seeks to address the long term reliability of such sensors when operated in adverse environments such as elevated temperatures or high radiation levels. The application is applicable (inter alia) to the measurement of physical parameters such as pressure, temperature and force, especially in high temperature environments.

BACKGROUND TO THE INVENTION

It is often desirable to measure pressure, temperature and force in environments that have very high ambient temperatures, such as at the bottom of oil or gas wells, inside nuclear reactors, or inside jet engines. Many of these environments are also characterized by inaccessibility, and the need for extreme reliability of operation. For example, the pressure and temperature at the bottom of an oil or gas well can be used to monitor the performance of the hydrocarbon reservoir. This information can aid the management of the production of that reservoir to maximise returns. The high temperatures that are often encountered at the bottom of oil or gas wells accelerate the aging and failure of electronic devices that are typically used in pressure and temperature gauge instrumentation.

As it is very costly to shut in an oil or gas well to change the downhole instrumentation, it is very important to maximize the lifetime and reliability of this instrumentation in this extreme environment. One solution is to install pressure and temperature gauges with no electronics. Strain gauge pressure sensors and platinum resistance thermometers are well known and extremely reliable at high temperatures. However, they require multiple insulated electrical conductors from the surface to the downhole sensors. It is difficult and expensive to obtain multiple conductor cable that is reliable in an oil or gas well, and the multiple pin connectors that are consequently required in the installation are also a source of high cost and potential unreliability.

One solution to measuring pressure at high temperatures, through a single conductor cable, is given in U.S. Pat. No. 4,255,973. In this sensor, a vibrating wire is connected to a bellows that is open to the fluid medium whose pressure is to be measured. Variations in pressure cause the tension in the wire to change, and hence the natural resonant frequency of this wire. The wire is placed in a magnetic field, and a current from the single conductor cable is passed through the vibrating wire. A remotely located positive feedback amplifier is connected to the other end of this single conductor cable and produces oscillations at the resonant frequency of the wire. Whilst this method admirably eliminates electronics from the sensor, it only enables one sensor to be activated per cable. Accordingly, a multiple parameter or multiple location sensor will still require several cables. In addition, the system does not appear well adapted for long distance use.

SUMMARY OF THE INVENTION

The present invention therefore provides a sensor apparatus comprising a plurality of resonant sensors each of whose operating frequencies shifts within a range dependent on at least the parameter sensed by the respective sensor, the ranges of each of the sensors being different. Thus, each can be interrogated by a signal along the same conductor enabling the use of a single conductor cable. It is of course preferred that the frequency ranges of the sensors are non-overlapping.

The sensors preferably comprise a vibrating element whose resonant frequency depends on the parameter measured by that sensor. This dependency can be obtained if the sensors further comprise a means for exerting a physical force on the vibrating element dependent on the parameter.

Where the parameter is temperature, the physical force can be exerted by holding the vibrating element of that sensor by a member of a material with a different coefficient of thermal expansion.

Where the parameter is pressure, the physical force can be exerted by holding the vibrating element of that sensor at one end by a member which is exposed to the relevant pressure and adapted to exert a force in response thereto.

The vibrating element(s) can be driven by a transducer such as a piezo element. The transducer can be driven by an oscillating signal. They will in turn produce an oscillating voltage in response to an oscillation of the vibrating element. It is preferred that the oscillating signal is fed to all transducers via a single conductor.

The drive signal to the transducer can be applied intermittently. This allows a period during which the system can "listen" for a return signal without it being swamped by the drive signal. Thus, it is also preferred that the system includes a signal analyser to detect signals from the transducers.

It seems that although double-ended tuning fork are known as such for other purposes, their advantages in borehole use have never been appreciated. In particular, their ability to permit the use of a single conductor cable leading to a downhole gauge or measurement head containing no electronics does not appear to have been noted. Accordingly, in a further aspect the present invention provides a sensor apparatus for remote parameter measurement in boreholes comprising a measurement head, a cable leading from the measurement head to remote instrumentation, a conductor within the cable leading to transducers within the measurement head which drive and are driven by resonating elements also within the measurement head and whose resonant frequency responds to the measured parameter.

The present invention thus enables the sensing of multiple parameters over a long single conductor cable. According to the present invention, two or more resonant sensors can be connected to a common single conductor cable. This overcomes the limitations of the prior art by providing a single conductor sensor that can operate without electronic equipment. Previously, single conductor sensors required electronic equipment at the sensor in order to provide analysis and multiplexing functions. Such electronics is vulnerable and places a limitation on the equipment life and operating temperature. Sensors without electronic equipment have previously required multiple conductors.

Each resonant sensor may be set into mechanical vibration by an electrical signal driven from a remote instrumentation package, this signal having a frequency at, or close to, the resonant frequency of the sensor. Each resonant sensor is connected to the common cable and is designed to resonate at a range of frequencies that do not overlap with the other sensors connected to the common cable. The precise frequency of resonance for each sensor depends primarily on the value of the physical parameter to be measured by that particular sensor. The remote instrumentation package can sweep the electrical drive signal over a range of frequencies and measure the frequency of the response from each of the sensors as each sensor is excited by this electrical drive signal. Each frequency is then converted to a value for the physical parameter being measured by that sensor, using previously recorded calibration information, as is well known.

As the present invention allows for multiple sensors, the value from one sensor can be used to perform an error correction on other sensors, in a known fashion. Typically, the value from the temperature sensor is used to apply a correction to (for example) a pressure sensor, as pressure sensors generally have a secondary response to variations in temperature as well as their primary response to variations in pressure.

Once the remote instrumentation package has determined the approximate frequencies of each of the sensors, a complete frequency sweep is not subsequently required as the instrumentation package may perform a reduced frequency sweep over a narrow range of frequencies close to the last frequency response from each of the sensors. The frequency sweep may be halted at the precise resonant frequency of each sensor, to enable accurate measurement of the frequency at that point.

A sensor with a Q value that is not too high will be excited at its resonant frequency by a drive signal which is merely close. Thus, frequent stimulation at the last known resonant frequency should be sufficient provided the parameter is not changing too swiftly. If desired, the drive frequency can be chosen by an algorithm employing historical data to predict a likely value, such as by linear or other extrapolation of a previous trend.

In a further embodiment of the present invention, the electrical drive signal is periodically interrupted, i.e. switched on and off. While the electrical drive signal is switched off, the remote instrumentation package can amplify the signal returned from the sensor, which will still be resonating provided the electrical drive signal was close to the resonant frequency prior to being switched off. This enables the signal from the sensor to be detected over very long cables.

In a still further embodiment of the present invention, sensors may be located at different physical locations and connected together by the common single conductor cable. For example, in an oil or gas well several sensor packages may be located at different depths in the well, connected together by one single conductor cable.

Many types of electrically driven resonant sensors are known. The vibrating wire sensor disclosed in U.S. Pat. No. 4,255,973 is one example. Double ended tuning forks (DE-TFs) are also widely used. In this type of resonant sensor, each tine of the DETF vibrates in anti-phase so that the sensor is balanced. This can provide a relatively high Q factor and reduce the effect of outside influences on the sensor. The resonating element of the sensor is typically made of steel, although quartz and silicon have the well known benefits of low drift and very high "Q" factor. Typically resonators are driven either electromagnetically as in the case of U.S. Pat. No. 4,255,973, or using piezoelectric drivers known as PZTs, or the natural piezoelectric effect that occurs in quartz crystals.

BRIEF DESCRIPTION OF THE DRAWINGS

An embodiment of the present invention will now be described by way of example, with reference to the accompanying figures, in which.

DETAILED DESCRIPTION OF THE EMBODIMENT

Figure 1:
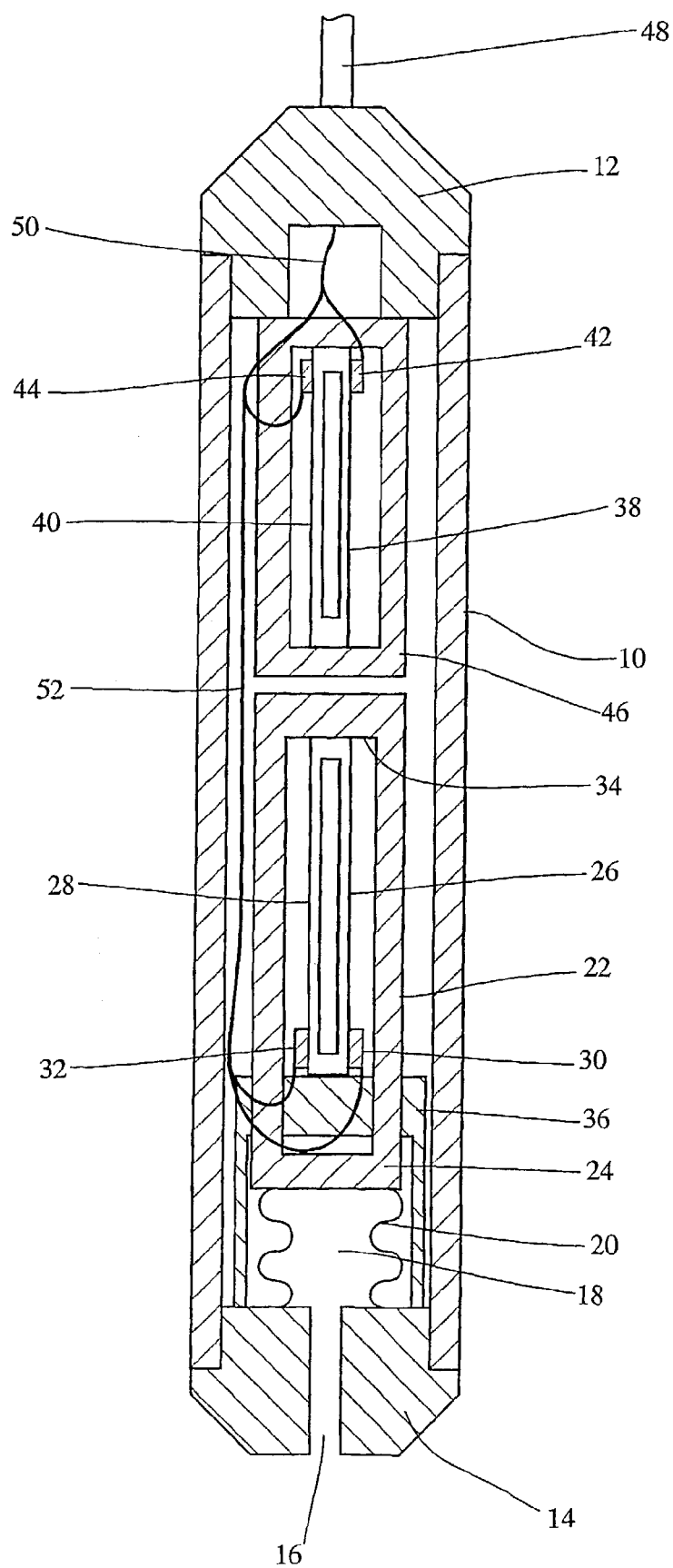
FIG. 1 shows a sectional view through a measurement head according to the present invention.

FIG. 1 shows a pressure and temperature gauge for use in oil and gas wells. A cylindrical pressure housing 10 is electron beam welded to a cablehead 12 at an upper end and a plug 14 at a lower end. In this description, upper and lower refer to orientations when the device is in its normal operating state within a well. This forms a sealed chamber that can withstand the high pressures required for this form of gauge. The fluid in the oil or gas well can enter via a pressure inlet 16 in the plug 14 and into an expansion volume 18 enclosed by bellows 20 sealed to the plug 14 at their lower end and to the base 24 of a closed-ended cylinder 22 at their upper end.

A pair of tines 26, 28 form a double ended tuning fork that is driven to vibrate in antiphase by a corresponding pair of PZT devices 30, 32. The fork thus formed is located within the cylinder 22, the upper end of the fork being attached to the inner face 34 of the upper end of the cylinder 22. The lower end of the fork is attached to a mounting 36 that is itself secured to the plug 14. The mounting could be secured to the housing 10, but securing the mounting 36 to the plug 14 allows easier assembly and servicing of the device. Slots are formed in the otherwise closed cylinder 22 to allow the mounting 36 to pass through.

The frequency of vibration of the tines 26, 28 is determined to some extent by temperature but also by the tension force to which they are subject. As the external pressure of the fluid in the oil or gas well increases, the pressure in the expansion volume 18 is applied to the base 24 of the closed-ended cylinder 22 and hence exerted on the upper end of the tines 26, 28 as these are secured to the mounting 36 at their lower end. This increases the natural resonant frequency of the tines 26, 28 with increasing pressure. Thus, the fork defined by tines 26, 28 responds to pressure in the well.

A second double-ended tuning fork is defined by two further tines, 38, 40. These are also driven to vibrate in antiphase by two further PZT devices 42, 44. The second fork is again in a closed cylinder 46 which is secured to the cablehead 12. Again, the cylinder 46 could be secured to the housing 10 but easier access is permitted by the design illustrated.

The cylinder 46 is made of a material with a higher thermal expansion coefficient than the material from which the tines 42, 44 are constructed. As a result, as the temperature increases the tension in tines 42, 44 also increases, as does their natural resonant frequency. Thus, the second fork responds to the ambient temperature.

Tuning forks of this type have a natural response to temperature. In some circumstances, therefore, it will be sufficient to rely on this and the cylinder 46 will be unnecessary.

A cable 48 is secured to the cablehead 12 and consists of an outer metal sheaf sealed to the cablehead 12 to prevent the ingress of fluid. A single insulated electrical conductor 50 is contained within the cable 48 and is connected to wiring 52 that leads to all four PZT devices 30, 32, 42, 44.

Figure 2:
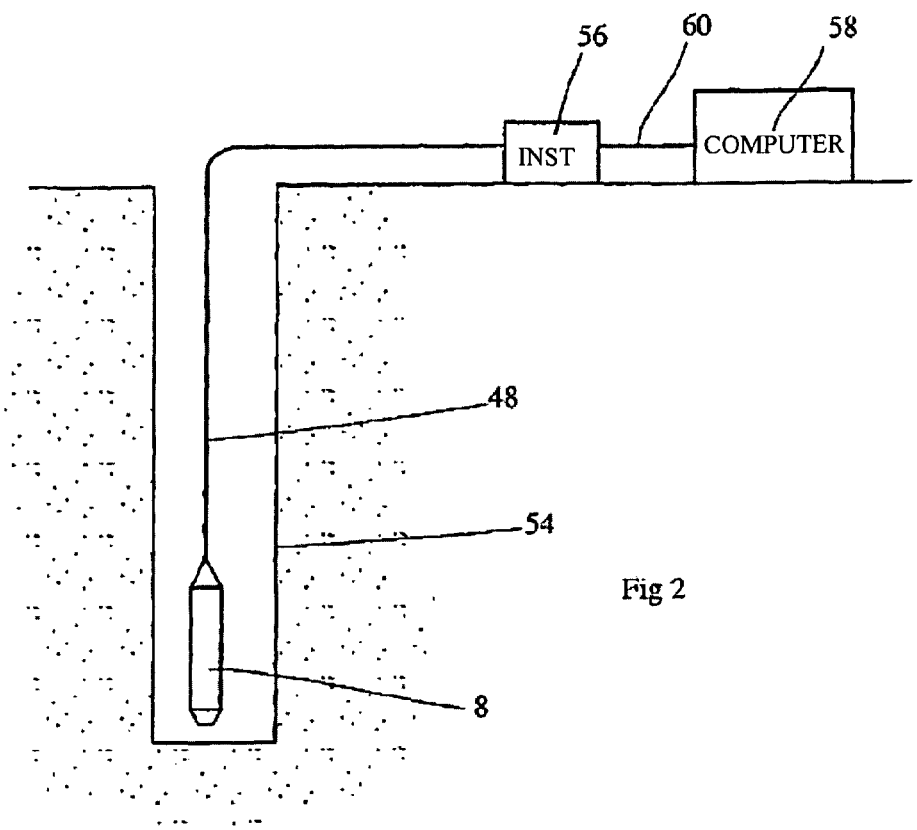
FIG. 2 shows an oilwell including a sensor according to the invention.

FIG. 2 illustrates an oilwell 54 with cable 48 connected to a pressure and temperature gauge 8 constructed as described in relation to FIG. 1. At a remote location on the surface outside the oilwell 54, the cable 48 is connected to instrumentation 56 which is in turn connected to a computer 58 via a serial cable 60.

Figure 3:
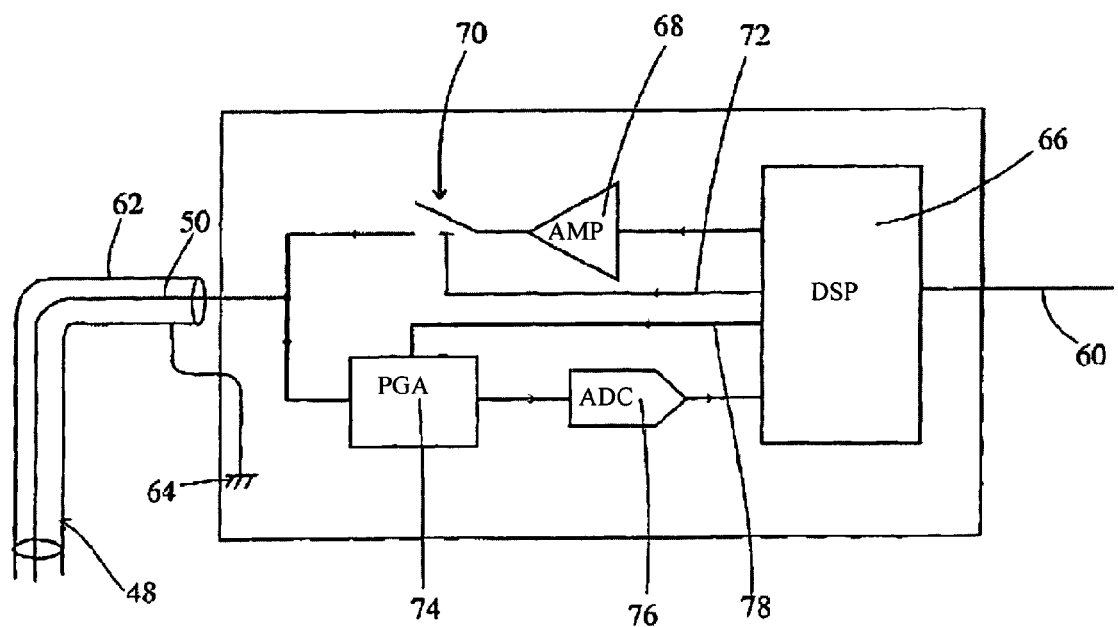
FIG. 3 shows the remote instrumentation for the invention.

FIG. 3 shows the instrumentation 56 in more detail. The outer metal sheaf 62 of the cable 48 is connected to the instrumentation ground 64. This provides a return path for the electrical drive and the signals passing on electrical conductor 50. A digital signal processor (DSP) 66 generates a drive signal that is sent to an amplifier 68 and thence to conductor 50 via a switch 70 Switch 70 is also under the control of the DSP 66 via control line 72.

Any electrical signal returned from the conductor 50 can be amplified in a programmable gain amplifier (PGA) 74 before being digitized by an analogue to digital converter (ADC) 76. The PGA 74 is under the control of the DSP 66 and the digital results from the ADC 76 are passed to the DSP 66. Processed results from DSP 66 are passed in digital format to the computer 58 via computer cable 60.

Referring now to FIGS. 1 and 3, the DSP 66 controls the sequence of operation. Firstly, switch 70 is closed and a drive signal at a particular frequency is connected to conductor 50. This drive signal travels to the PZT devices 30, 32, 42, 44. If the drive frequency is close to the resonant frequency of a tine, they will be forced into oscillation. It is important to note that the resonant frequency of only one pair of tines, 26, 28 or 38, 40 can be close to any drive frequency, as the tines are designed so that no overlap of resonant frequency occurs, irrespective of the pressure or temperature. This is achieved either by design of the physical aspects of the tines or by placing a preload on one or both pairs of tines. The latter is preferred as the primary purpose of the temperature sensor is to calibrate the pressure sensor, in which case physically identical pairs of tines are preferred.

Next, switch 70 is opened and the signal from any resonating pair of tines is amplified in PGA 74 before being digitised in ADC 76 and analysed by the DSP 66. The DSP 66 controls the gain of PGA 74 via control line 78 to obtain an optimum signal level. The DSP 66 obtains the exact frequency of the signal by measuring the time between each zero crossing of the signal, and taking an average. This exact frequency is sent to the computer 58.

When the DSP 66 first starts operating, the drive frequency selected for each interrogation sequence sweeps across the possible resonant frequencies of first the pressure sensor and then the temperature sensor, until the resonant frequency of each is found. This can take some time, so thereafter the drive frequency selected when attempting to resonate the pressure sensor is the last measured resonant frequency of the pressure sense, from the previous sequence. A similar approach is adopted for the temperature sensor. This enables rapid interrogation of the sensors.

Figure 4:
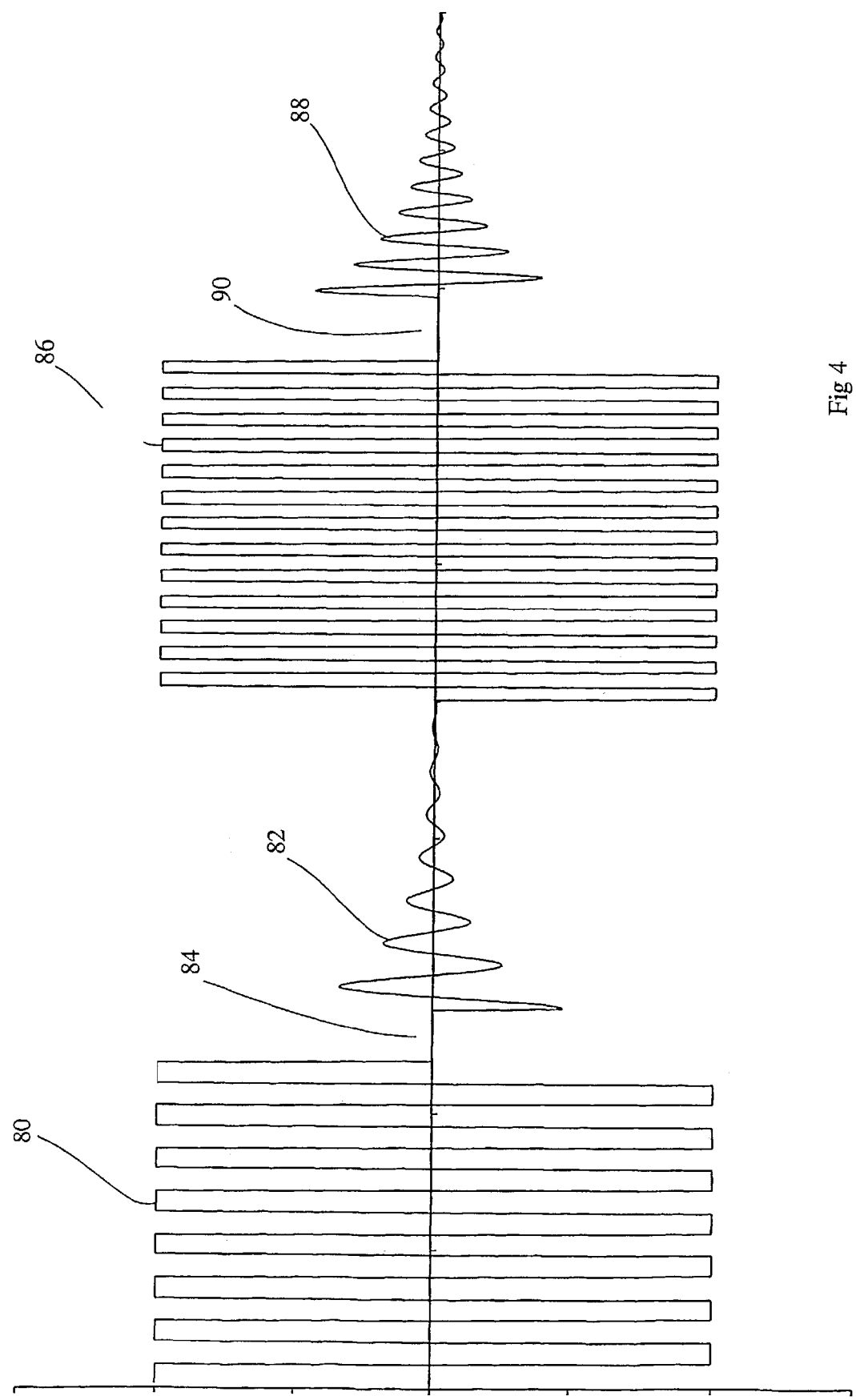
FIG. 4 shows the voltage existing on the single conductor, with time.

FIG. 4 further illustrates the sequence events in which a time trace of the voltage on the conductor 50 is shown. The trace shows the first applied drive frequency at 80, from the amplifier 68 with switch 70 closed. The switch 70 is opened, and assuming the drive frequency was close to the resonant frequency of the pressure sensor there will be a return signal 82 from the PZTs 30, 32 resulting from the continued resonance of the tines 26, 28. A short gap 84 may be necessary to allow transients from the drive signal to die away. The return signal will die away (as shown) as there is now no signal driving the resonating elements.

The switch 70 is then closed again and the next applied drive frequency 86 for the temperature sensor is applied for a time. The switch 70 is opened, and again, if the drive frequency was close to the resonant frequency of the temperature sensor there will be a return signal 88 at the resonant frequncy of the temperature sensor, after a short delay 90.

This pattern is immediately repeated with the applied drive frequency in each case taken from the actual signal frequency on the previous cycle. The drive will then be close to the actual resonant frequency and will excite the sensor to return a signal at that actual frequency. In this way the applied drive frequency closely tracks the natural resonant frequency.

In this example, the pressure sensor resonant frequency changes from 4000 Hz to 5000 Hz over the pressure range 0 psi to 10,000 psi. The temperature sensor resonant frequency changes from 6000 Hz to 7000 Hz over the temperature range 0° C. to 200° C. Thus, the resonant frequency ranges do not overlap.

When the DSP 66 first powers up, it sweeps the frequency range 4000-5000 Hz in 10 Hz steps, looking for the resonance from the pressure sensor. It then sweeps the range 6000-7000 Hz in 10 Hz steps, looking for the resonance of the temperature sensor. Once these resonances are found, the DSP 66 alternates between the last pressure resonance, and the last temperature resonance as shown in FIG. 4.

A simple linear calibration for pressure and temperature uses the formulae:

Pressure (psi)=$(F_p-4000)*10,000/1000$ where $F_p$ is the pressure resonant frequency in Hz;

Temperature (° C.)=$(F_t-6000)*200/100$ where $F_t$ is the temperature resonant frequency in Hz.

For example, if the pressure resonant frequency were found to be 4500 Hz, this would compute to a pressure of 5000 psi. If the temperature resonant frequency were found to be 6500 Hz, this would compute to a temperature of 100° C. Of course, more complex calibration methods can be applied, using polynomial equations to correct for any non linearity of the sensors, and using the temperature from the temperature sensor to correct the results from the pressure sensor. Such calibration methods are well known.

The invention claimed is:

1. A sensor apparatus comprising a plurality of resonant sensors connected to a common electrical conductor that provides drive signals to each such sensor, wherein each sensor further comprises a vibrating element, and wherein the resonant frequency of each sensor shifts within a range dependent on at least a parameter sensed by the respective sensor, and wherein the ranges of the sensors being different and non-overlapping.

2. The apparatus according to claim 1 in which the vibrating element is driven by a transducer.

3. The apparatus according to claim 2, wherein transducer is driven by an oscillating signal.

4. The apparatus according to claim 3, wherein the transducers produces an oscillating voltage in response to an oscillation of the vibrating element.

5. The apparatus according to claim 3 or claim 4, wherein the oscillating signal is fed to all transducers via the single electrical conductor.

6. The apparatus according to any one of the claims 2 to 4 in which the transducer is a piezo element.

7. The apparatus according to any one of the claims 2 to 4 in which the drive signal to the transducer is intermittent.

8. The apparatus according to claim 7, further comprising a signal analyzer to detect signals from each of the transducers.

9. The apparatus of claim 1, wherein the plurality of resonant sensors includes at least two sensors, each such sensor sensing a different parameter.

10. A sensor apparatus comprising a plurality of resonant sensors each of whose operating frequency shifts within a range dependent on at least a parameter sensed by the respective sensor, the ranges of the sensors being different and non-overlapping, and all of the sensors being supplied drive signals by a single electrical conductor.

11. The apparatus according to claim 10, wherein each of the sensors comprises a vibrating element whose resonant frequency depends on the parameter sensed by that sensor.

12. An apparatus comprising a plurality of resonant sensors connected to a common electrical conductor that provides drive signals to each such sensor, wherein each sensor further comprises a vibrating element, and wherein the resonant frequency of each sensor shifts within a range dependent on at least a parameter sensed by the respective sensor, the ranges of sensors being different, and wherein the sensors comprise a device for exerting a physical force on the vibrating elements dependent on the parameter sensed.

13. The apparatus according to claim 12, wherein the parameter sensed by at least one sensor is temperature and the vibrating element of that sensor is held by a member of a material with a different coefficient of thermal expansion than that of the vibrating element.

14. The apparatus according to claim 12 or claim 13, wherein the parameter sensed by at least one sensor is pressure and the vibrating element of that sensor is held at one end by a member which is exposed to pressure that exerts a force on the vibrating element in response thereto.

15. A sensor for remote parameter measurement in a borehole comprising a measurement head, a cable leading from the measurement head to a remote instrumentation, a single electrical conductor within the cable leading to transducers within the measurement head, each of which drives and is driven by a resonating element within the measurement head and whose resonant frequency responds to a measured parameter.

16. An apparatus, comprising:

a plurality of resonant sensors connected to a common electrical conductor that provides drive signals to each such sensor, wherein each sensor includes a double-ended tuning fork that comprises a vibrating element, and wherein the resonant frequency of each sensor shifts within a range dependent on at least a parameter sensed by the respective sensor, the ranges of each of the sensor being different.

* * * * *